(12) United States Patent
Ferguson

(10) Patent No.: US 6,371,578 B1
(45) Date of Patent: Apr. 16, 2002

(54) AXLE PROTECTOR FOR TRACKED VEHICLE

(76) Inventor: Jeff Ferguson, 12331 Halls Hill Pike, Milton, TN (US) 37118

( * ) Notice: Subject to any disclaimer, the term of this patent is extended or adjusted under 35 U.S.C. 154(b) by 0 days.

(21) Appl. No.: 09/482,185

(22) Filed: Jan. 12, 2000

(51) Int. Cl.[7] .............................................. B60B 19/02
(52) U.S. Cl. ............................................... 305/107
(58) Field of Search ................................ 305/106, 107, 305/108, 109, 110

(56) References Cited

U.S. PATENT DOCUMENTS

| | | | |
|---|---|---|---|
| 1,992,702 A | | 2/1935 | Koop |
| 2,146,882 A | * | 2/1939 | Baker et al. ................. 305/109 |
| 2,418,610 A | | 4/1947 | Webb |
| 3,861,762 A | | 1/1975 | Freedy et al. |
| 3,912,336 A | * | 10/1975 | Ritter, Jr. et al. ............ 305/100 |
| 3,913,985 A | * | 10/1975 | Orr et al. ..................... 305/110 |
| 4,738,494 A | | 4/1988 | Bedis |
| 5,330,260 A | | 7/1994 | Freeman |
| 5,713,644 A | * | 2/1998 | Freeman ....................... 305/110 |
| 5,733,020 A | * | 3/1998 | McCartney et al. ......... 305/107 |
| 5,775,447 A | | 7/1998 | Dester et al. |
| 5,820,230 A | * | 10/1998 | Freeman ....................... 305/107 |
| 5,873,424 A | | 2/1999 | Gustafson et al. |
| 5,951,123 A | * | 9/1999 | Bomstad et al. ............. 305/107 |
| 5,967,630 A | * | 10/1999 | Sewell ......................... 305/110 |
| 6,019,443 A | * | 2/2000 | Freeman ....................... 305/110 |
| 6,045,201 A | * | 4/2000 | Chappell et al. ............. 305/110 |
| 6,231,136 B1 | * | 5/2001 | Freeman ....................... 305/107 |

* cited by examiner

Primary Examiner—S. Joseph Morano
Assistant Examiner—Long Bao Nguyen
(74) Attorney, Agent, or Firm—Waddey & Patterson, P.C.; David B. Pieper

(57) ABSTRACT

A seal protection assembly for protecting an axle, wheel, gasket, and seal for a wheel attached to an axle on a vehicle. The assembly includes a body housing, a rim edge, and a mounting bracket. The assembly is mounted to the vehicle to protect the wheel axle, gasket, and seal from harmful contact with extraneous material from the operating environment of the vehicle, while allowing for maintenance access to the axle components. Multiple assembly sets for protecting all of the wheel seals on a vehicle are also disclosed along with a method for manufacturing the assembly.

20 Claims, 5 Drawing Sheets

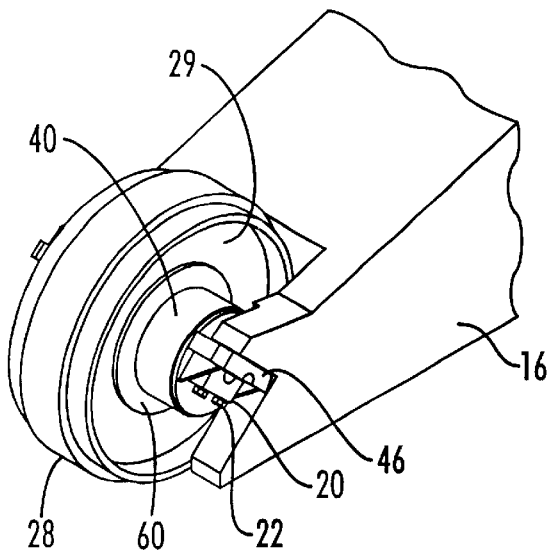
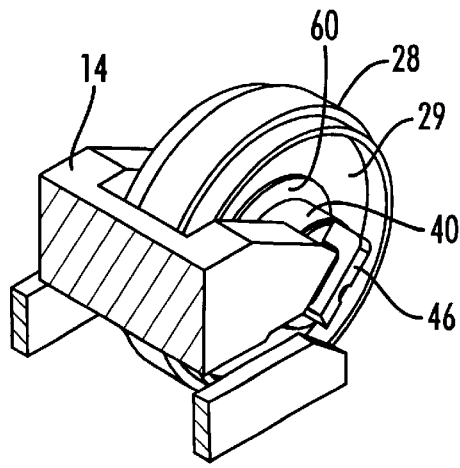
FIG. 5
FIG. 4
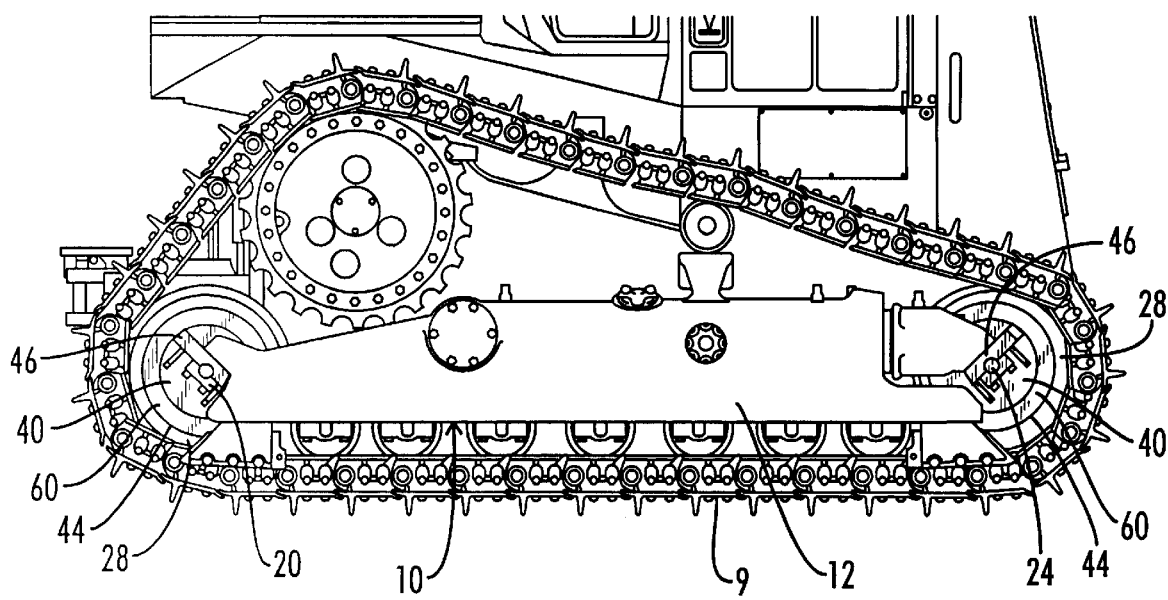
FIG. 6

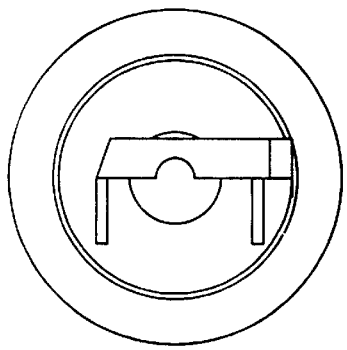
FIG. 11
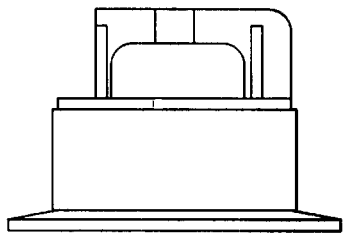 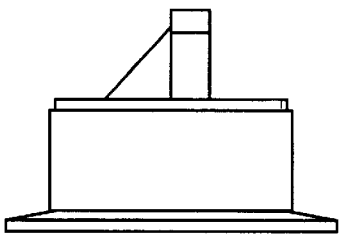 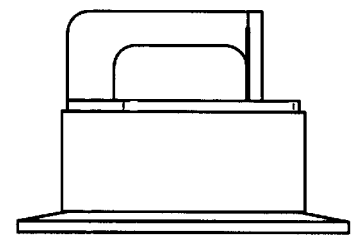
FIG. 12    FIG. 13    FIG. 14
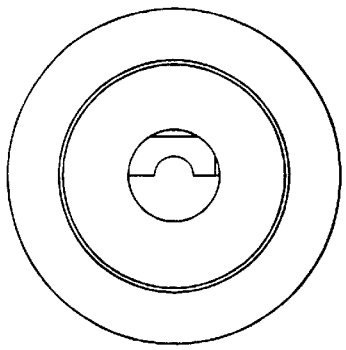
FIG. 15

AXLE PROTECTOR FOR TRACKED VEHICLE

BACKGROUND OF THE INVENTION

The present invention relates generally to vehicles with an axle gasket or seal and more particularly, this invention pertains to tracked vehicles operating in severe duty environments such as landfills.

FIG. 1 shows a prior art roller assembly 10 for a tracked vehicle 8. The track 9 rides on the roller assembly 10 which includes the roller frame 12 with a front axle support arm 14 and a rear axle support arm 16. The support arms 14, 16 allow for the inner axle support brackets 18 and outer axle support brackets 20 to be attached to the arms 14, 16 with axle support bolts 22. The axle support bolts 22 pass through the brackets 18, 20 and screw into the arms 14, 16. This supports the axle 24 for and holds the axle in position. The axle 24 supports the idler wheel 28 for the vehicle track 9. This type of assembly is typical for vehicles that utilize tracks 9 for movement across the ground, and similar axle to wheel style setups are also used for wheeled vehicles.

As shown in the standard layout of FIG. 1, the vehicle's wheels 28 or tracks 9 rotate around, or are driven by the axles 24. The wheels 28 and axles 24 are supported by bearings (not shown) and the juncture between the wheel 28 and the axles 24 utilize gaskets 30 (not shown) to keep extraneous dirt out of these bearings. In addition, these gaskets 30 help to contain the internal fluid or lubrication system for the axles 24. In extreme operating environments, these gaskets 30 can be punctured or torn out by wire, metal bars, twisting rope, sticks and other materials that wrap around the axles 24 or simply contact or rub against these gaskets 30. Previous protection devices and systems consist of a guard that is connected to the moving and turning idler wheels 28. These moving guards provide minimal protection to the gaskets 30 which continue to fail in extreme environments.

FIG. 2 is an end view with a left side cutaway of the prior art axle mounting of an idler wheel assembly 27. The idler wheel 28 rotates around the axle 24 on a bearing 25. The outer rim 62 is supported by an interior support wall 63 and interior rim 64 defining an inner pocket 29. As previously discussed, the wheel 28 is supported by the bearing 25 and the juncture between the wheel 28 and the axles 24 utilize gaskets 30 to keep extraneous dirt out of the bearing 25. The axle 24 is held in place by the inner axle support brackets 18 and outer axle support brackets 20 with axle support bolts 22. The wheel 28 has an inner pocket 29 which saves on material costs and weight for the construction of the wheel 28. Material can collect in this inner pocket 29 and wrap around the axle 24 to cause the failure of the idler wheel assembly.

Several United States Patents have been directed towards protection systems. These patents include U.S. Pat. No. 1,992,702, issued to Koop on Feb. 26, 1935; U.S. Pat. No. 2,146,882, issued to Baker et al. on Feb. 14, 1939; U.S. Pat. No. 2,418,610, issued to Webb on Apr. 8, 1947; U.S. Pat. No. 3,861,762, issued to Freedy et al. on Jan. 21, 1975; U.S. Pat. No. 4,738,494, issued to Bedis on Apr. 19, 1988; U.S. Pat. No. 5,330,260, issued to Freeman on Jul. 19, 1994; U.S. Pat. No. 5,775,447, issued to Dester et al. on Jul. 7, 1998; and U.S. Pat. No. 5,873,424, issued to Gustafson et al. on Feb. 23, 1999. The following is a brief discussion of the most relevant of these patents.

U.S. Pat. No. 1,992,702 issued to M.T. Koop on Feb. 26, 1935, discloses a Dirt Guard for Track Type Tractors. This invention discloses the use of a dirt guard which is positioned along the lower portion of the track during the contact between the track and ground. This invention utilizes a flexible rubber strip connected to a metal base.

U.S. Pat. No. 2,146,882 issued to Baker, et al. on Feb. 14, 1939, Th discloses a Sprocket Shield. This invention discloses a shield which is secured to the tracked frame for protecting a sprocket wheel. This shield extends outwardly in a circular edge which is positioned adjacent to the plane of the sprocket wheel. A straight lower edge is utilized for mounting of the shield with the track frame. This invention is designed specifically for the protection of the sprocket wheel and is not designed to protect the front idler wheel. Note that this shield must be utilized with a lower shield in order to provide full protection for the axle bearing and gasket seal. This shield does not provide for protection from the intrusion of wire or other items along the entire surface of the sprocket wheel.

U.S. Pat. No. 2,418,610 issued to Webb on Apr. 8, 1947, discloses a Tractor Track Guard. This invention is not directed towards the mud guard application, but is directed towards an attachment or guard to keep the track on the rollers, sprockets, and front idler.

U.S. Pat. No. 3,861,762 issued to Freedy, et al. on Jan. 1, 1975, discloses a Guard and Scraper for an Idler Wheel. This patent specification is related to a guard for a slidable bracket for an idler assembly. The invention operates as a guard and scraper for protecting from the sliding bearing surfaces which allow for tensioning of the track on the vehicle. This allows for the scraping action of this guard to effectively remove material that accumulates on the idler wall.

U.S. Pat. No. 5,330,260 issued to Freeman on Jul. 19, 1994, describes a wheel cleaning system. This invention describes the use of a pair of cutter blades which are associated with the wheel and its respective axle to cut away debris that would otherwise wrap around the associated axle.

U.S. Pat. No. 5,775,447 issued to Dester et al. on Jul. 7, 1998, discloses a Material Deflecting Assembly for a Track Assembly. This patent is directed towards a material deflector assembly which utilizes deflecting plates which are secured to the bifurcated arms in order to direct debris away from the idler.

U.S. Pat. No. 5,873,424 issued to Gustafson, et al. on Feb. 23, 1999, discloses an Apparatus for Protecting a Track Assembly of a Tractor. This invention is directed towards an apparatus which is utilized to protect the track assembly of a tractor.

These previous styles of guards fail to properly and fully protect the axle, gasket, and seal in extreme operating environments. Thus, what is needed, is a full rotation axle protector for a tracked vehicle axle gasket or seal assembly.

SUMMARY OF THE INVENTION

In accordance with the present invention, a gasket and seal protection assembly is disclosed which addresses the drawbacks of the prior art devices. The present invention is directed towards an axle, gasket, and seal protection assembly for protecting an axle, gasket, and seal for a wheel attached to an axle on a vehicle. The assembly is designed to protect the axle, wheel, and gasket from extraneous material in the operating environment of the vehicle. The assembly includes a body housing which supports and positions a rim edge in a gap relation to the wheel to protect the wheel against the extraneous material while allowing the wheel to rotate. The body housing is attached to the vehicle by a mounting bracket attached to the body housing.

In accordance with one example, the present invention utilizes a crown base at the proximate end of the housing for attaching the mounting bracket.

Yet another example teaches the use of an axle opening which allows for access to the end of the axle.

A further example of the invention teaches that the body housing or rim may be cupped to direct extraneous material away from the axle, gasket, and seal.

A further example teaches the inclusion of an axle oil-plug access slot for maintenance of the axle without removal of the protection assembly.

The invention may be mounted to protect either an inner or an outer axle portion, wheel portion, gasket or seal on an axle, and the mounting bracket may be shaped to allow for mounting the assembly to protect these elements on any one of multiple axles.

The invention also teaches that a crown gusset may be attached to the mounting bracket and the body housing for additional strength for the assembly.

Multiple protection assemblies may be used to protect an entire vehicle with wheel gasket assemblies by utilizing both an inner gasket and an outer gasket, and further protection assemblies may be used to protect multiple wheel gaskets on additional axles.

The invention also teaches a method for protecting the axle, wheel, and gasket assembly located between a wheel and axle. The method includes the basic steps of manufacturing an axle protector with a rim edge on the distal end of a body housing, constructing a mounting bracket on the proximate end of the body housing, and mounting the mounting bracket to the axle support so that the rim edge is in a gap relation to the wheel. Further refinements to this method are further disclosed herein.

Other objects and further scope of the applicability of the present invention will become apparent from the detailed description to follow, taken in conjunction with the accompanying drawings wherein like parts are designated by like reference numerals.

BRIEF DESCRIPTION OF THE DRAWINGS

FIG. 4 is an isometric view of the rear axle mounting with full rotation axle, gasket, and seal protectors shown mounted on the inner axle support bracket.

FIG. 5 is an isometric view of the front axle mounting with full rotation axle, gasket, and seal protectors shown mounted on the inner axle support bracket.

FIG. 6 is a side view of the vehicle track and roller frame with idler wheel assemblies protected by full rotation axle, gasket, and seal protectors.

FIG. 11 is a top view of the full rotation axle, gasket, and seal protector.

FIG. 12 is a front view of the full rotation axle, gasket, and seal protector.

FIG. 13 is a side view of the full rotation axle, gasket, and seal protector.

FIG. 14 is a back view of the full rotation axle, gasket, and seal protector.

FIG. 15 is a bottom view of the full rotation axle, gasket, and seal protector.

DESCRIPTION OF THE PREFERRED EMBODIMENTS

In accordance with an exemplary embodiment of the present invention as shown in FIGS. 3–15, a full rotation axle, gasket, and seal protection apparatus, device, or assembly is generally designated by the numeral 40. The full rotation axle, gasket, and seal protection apparatus includes as major components a body housing 42, a rim edge 44, and a mounting bracket 46. Unless otherwise noted, all dimensions are stated for manufacturing a the gasket protection assembly for a D7R style idler wheel on a Caterpillar style of bulldozer.

Figure 1:
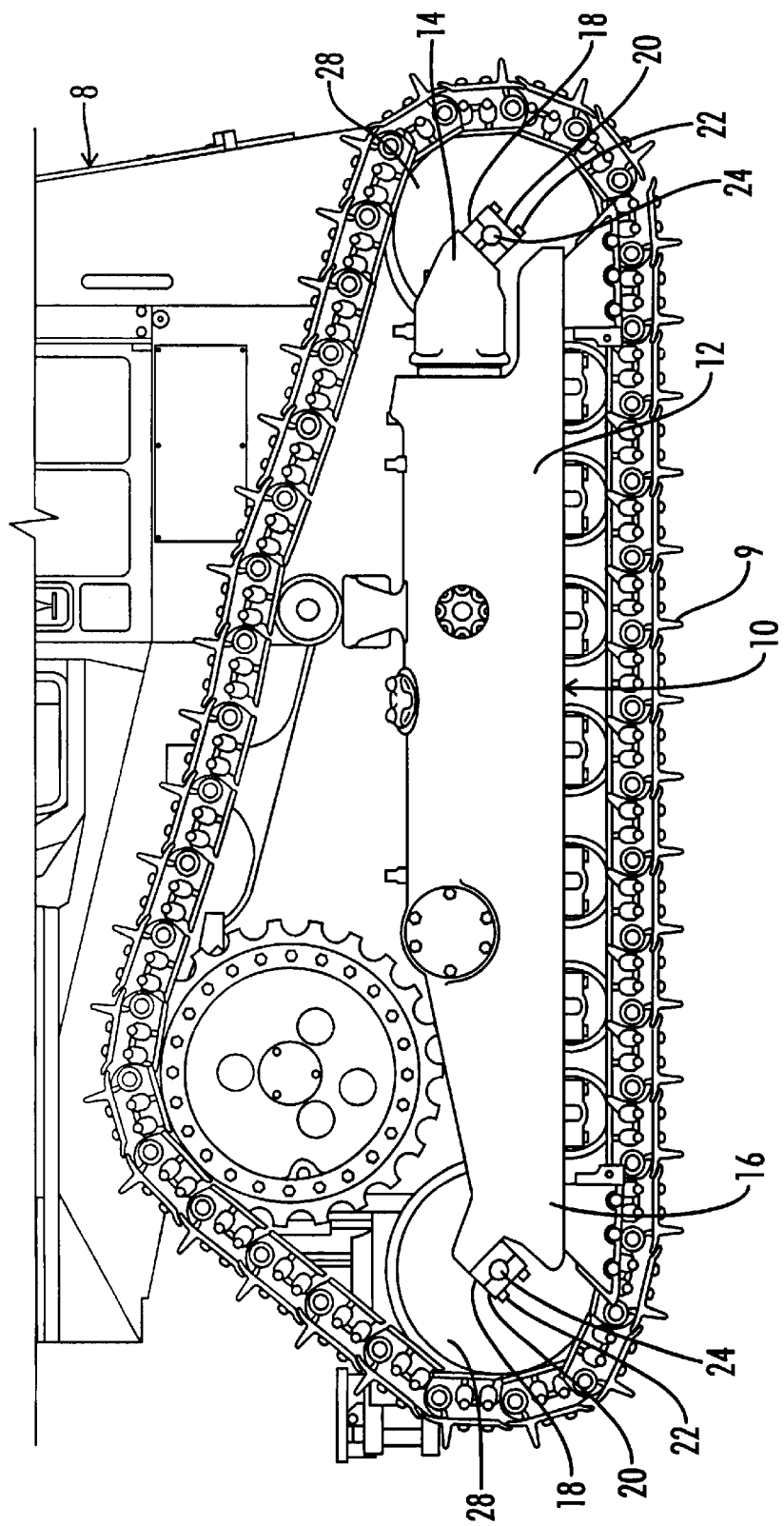
FIG. 1 is a side view of the prior art vehicle track and roller frame with idler wheel assembly.
Figure 2:
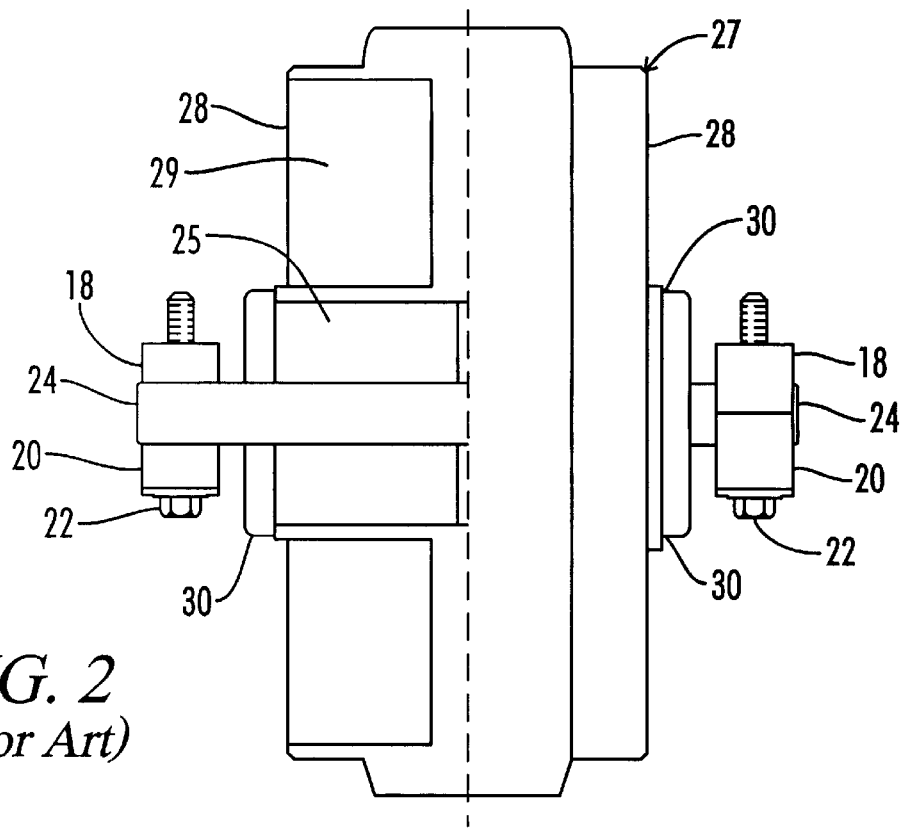
FIG. 2 is an end view with a left side cutaway of the prior art axle mounting of an idler wheel assembly.
Figure 3:
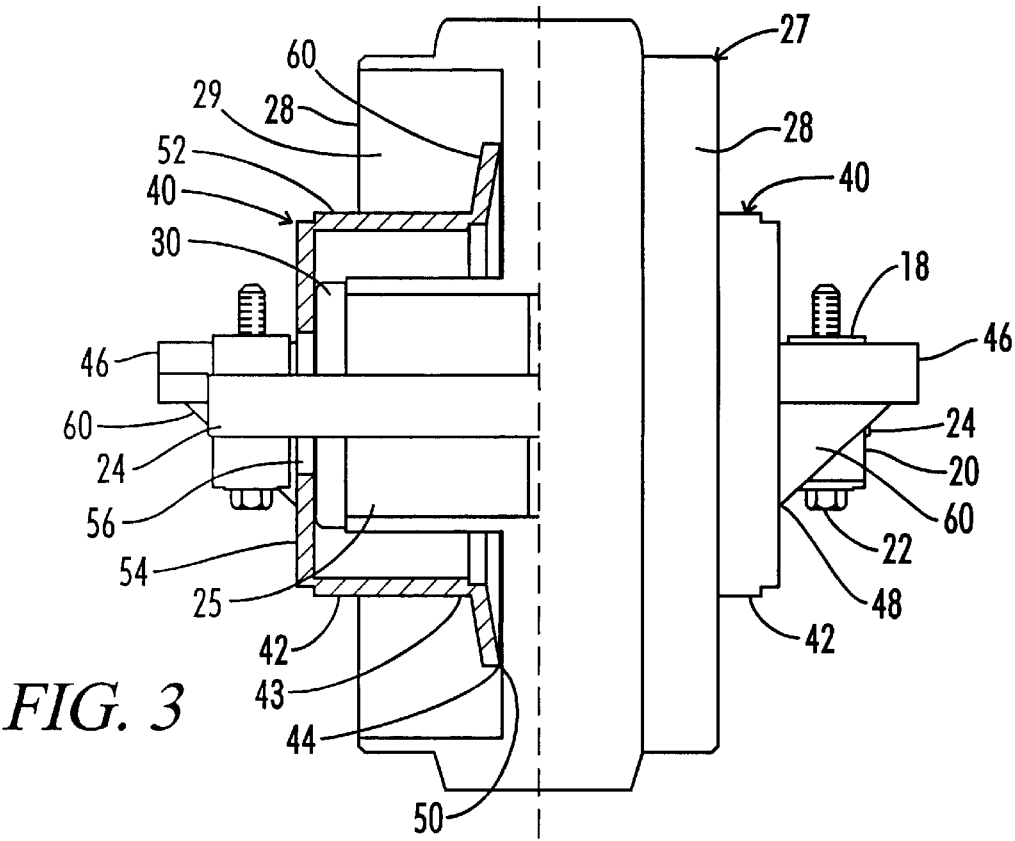
FIG. 3 is an end view with a left side cutaway of the axle mounting of FIG. 2 with inside and outside full rotation axle, gasket, and seal protectors shown mounted on the inner axle support brackets.

FIG. 3 is an end view with cutaway of the idler wheel assembly 27 of FIG. 2 with inside and outside full rotation axle, gasket, and seal protectors 40 shown mounted on both the left and right inner axle support brackets 18.

Figure 7:
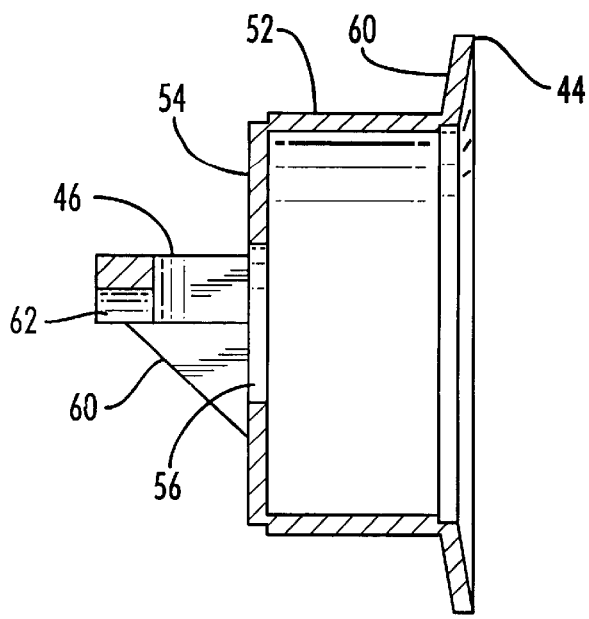
FIG. 7 is a out away view of a full rotation axle, gasket, and seal protector.
Figure 8:
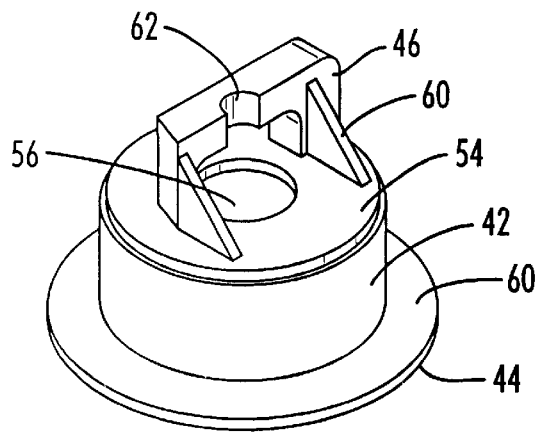
FIG. 8 is a front-side-top isometric view of the full rotation axle, gasket, and seal protector.
Figure 9:
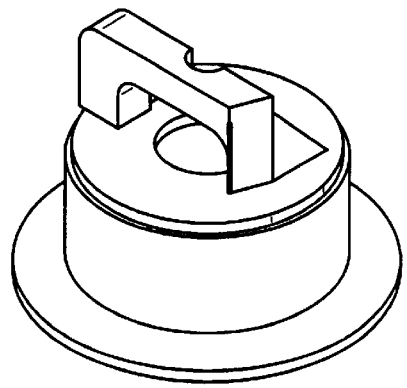
FIG. 9 a back-side-top top isometric view of the full rotation axle, gasket, and seal protector.
Figure 10:
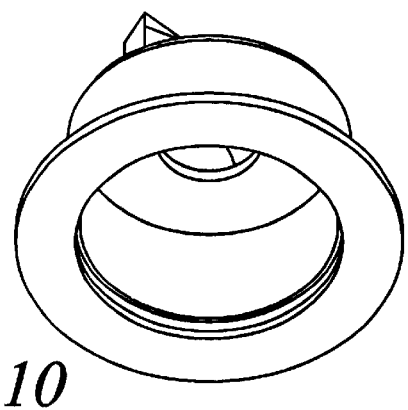
FIG. 10 is a bottom-front-side isometric views of the full rotation axle, gasket, and seal protect

The right side of FIG. 3, the isometric views of FIGS. 4 and 5, and the side view of FIG. 7 show the non-cutaway view of the mounting of the gasket protectors 40 on the idler wheel assembly 27. The body housing 42 of the gasket protector 40 extends into the inner pocket 29 (hidden by the wheel rim) of the idler wheel 28. The body housing 40 is supported by the mounting bracket 46 which is attached to the right side inner axle support bracket 18.

The left side of FIG. 3 shows the cutaway view of the mounting of the gasket protection assembly 40 for protecting the axle gasket 30. The cutaway view of only the gasket protection assembly is shown in FIG. 7, and additional views of the assembly are shown in FIGS. 8 through 15. These views show how the protection assembly 40 is mounted over the axle portion of the wheel 28. This gasket protection assembly 40 is designed to protect the gasket 30 from extraneous material that can wear against, dislodge, or puncture the gasket 30. The gasket protection assembly 40 includes a body housing 42, a rim edge 44, and the mounting bracket 46.

The body housing 42 may be a straight pipe as shown in the drawings, or alternatively, the body housing 42 may be cupped or angled to direct extraneous material that gets inside the body housing 42 away from the axle gasket 30. However, this would form an angle directing material towards the gasket 30 on the outside of the body housing 42. Thus, the preferred embodiment utilizes a straight body housing 42 as shown in the drawings such that extraneous material is neither directed towards or away from the gasket 30. The preferred embodiment of the body housing 42 is constructed from one (1) inch thick steel pipe with a ten (10) inch inside diameter and an eleven (11) inch outside diameter.

The rim edge 44 is supported by a distal end 43 of the body housing 42 such that the rim edge 44 is positioned in a gap 50 relation to the wheel 28 to protect against the extraneous material. The gap 50 should be small enough to allow for the wheel 28 to rotate while still excluding as much extraneous material as possible. It has been found that a gap 46 of one-sixteenth (1/16th) of one inch is ideal for this purpose. Both larger and smaller gap sizes may be utilized with the present invention although a corresponding loss in effectiveness will accompany the larger gap sizes, and smaller gap sizes tend to cause drag or friction against the rotation of the wheel 28.

In the preferred embodiment, the rim edge 44 is located on the edge of a guard brim 60 that is attached to the main body housing 42. The guard brim 60 supports the rim edge 44 in an extended position from the body housing 42. The brim 60 may be cupped from the body housing 42 to the rim edge 44 to direct extraneous material inside the body housing 42 away from the axle gasket 30. In addition, this brim 60 deflects material away from the rim edge 44 on the outside of the gasket protection assembly 40. The preferred embodiment of the brim is constructed from one-half inch (½) thick plate steel with an outside diameter of fifteen (15) inches and an inside diameter of ten and three eighths (10 ⅜) inches. This ring is the cupped to approximately five (5) degrees from the inner diameter to the outside diameter. This cupping allows for the rim edge to be placed close to the wheel without having the body of the brim in tight relation to wheel across brim's surface.

The body housing 42 includes a crown base 54 at the proximate end 42 of the housing 42 for attaching the mounting bracket 46. This crown base 54 includes an axle opening 56 which allows for access to the end of the axle 24. The crown base is a ½ inch thick flat plate with an outside diameter of 10.5 inches and an axle opening of 4.125 inches in diameter when constructed for a D7R idler wheel.

The mounting bracket 46 is attached to a proximate end 52 of the body housing at the location of the crown base 54 for supporting the gasket protection assembly 40 on the vehicle 8. The mounting bracket may be welded or otherwise attached to the inner axle support bracket 18 for installation. It is also envisioned that the inner axle support bracket 18 may be incorporated into the mounting bracket 46 although the preferred embodiment allows for the assembly 40 to be constructed for retrofit applications as well as new applications. Further changes to the style or construction of the mounting bracket 46 can be constructed as long as the bracket 46 allows for the assembly 40 to hold the rim edge 44 in the proper position in relation to the wheel 28.

The mounting bracket 46 includes an axle oil-plug access slot 62 which allows for access to and removal of the oil access plug on the end of the axle 24. The mounting bracket 46 is shaped allow for inter-changeable mounting the assembly at multiple location on the vehicle including mounting locations to protect either an inner seal or an outer seal on an axle 24, or to protect gaskets located on any one of multiple vehicle axles 24. The mounting bracket measures nine (9) inches long by four (4) inches high and one and three quarters (1¾) inches thick. The half circle for the axle oil-plug access slot 62 is one and three quarters (1.75) inches wide by seven eighths of one inch (0.875) deep for the height of the bracket 46. The bottom of the bracket 46 is cut out for clearance of the axle 24 by removing a slot six (6) inches long by two and one-half (2½) inches high where the bracket 46 is joined to the crown base 54. Other modification to the shape of the bracket may be made for clearance purposes with other components.

The gasket guard protection assembly 40 may be further strengthened by crown gussets 61 attached to the mounting bracket 46 and the body housing 42. These gussets 61 are attached to the bracket 46 and the crown base 54. The gussets 61 are constructed from one half inch (½) thick plate in a triangle shape to fit the crown base 54 and mounting bracket 46.

Multiple guard protectors may be utilized to fully protect the axle, gasket, and seals on a vehicle. FIG. 3 showed how the gasket protectors could be used for both inside and outside gasket protection, and FIGS. 4, 5, and 6 show how the gasket protectors may be used in both rear axle and front axle configurations. Thus, a gasket guard protection assembly set can be constructed utilizing multiple gasket guards to protect a wheel gasket assembly with an inner gasket and an outer gasket from extraneous material. Each protection set would include a first rim-edge, gasket-protection assembly for protecting the inner gasket and a second rim-edge, gasket-protection assembly for protecting the outer gasket.

A further gasket guard protection assembly set can be constructed for protecting the wheel gasket assemblies on a two axle vehicle with four wheels where each wheel has both an inner gasket and an outer gasket. The set includes eight rim-edge, gasket-protection assemblies. A protection assembly is located at the inner gasket of each wheel and another protection assembly is located at the outer gasket of each wheel for each of the four wheels.

The present invention provides a method for protecting a gasket between a wheel and axle which includes manufacturing an axle protector with a rim edge on the distal end of a body housing, constructing a mounting bracket on the proximate end of the body housing; and mounting the mounting bracket to the axle support so that the rim edge is in a gap relation to the wheel so that the wheel may rotate while minimizing the effects of the extraneous material on the axle, gasket, and seal.

The step of manufacturing the axle protector includes making a body housing with a first end and a second end; and forming a rim on the first end of the body housing. The rim is formed by cutting a plate of steel or other appropriate material to form a brim with an outside edge and an inside edge and attaching the brim to the first end of the body housing so that the outside edge of the brim forms the rim edge on the first end of the body housing. The brim may also be cupped from the outside edge to the inside edge before or after installation on the body housing.

The step of constructing the mounting bracket includes fabricating a crown base and an idler cap attachment bracket, attaching the attachment bracket to the crown base, and connecting the crown base to the proximate end of the body housing. The step of constructing the mounting bracket may also include shaping of an axle plug slot in the idler cap attachment bracket.

The method of manufacturing the axle protection guard may also include the fabrication of the crown gussets and joining of the gussets to the crown cap and the crown base.

The steps of attaching, connecting, and joining and the like are preferably done by welding on both the inside and outside of the part to connect the various parts together to construct the preferred embodiment. However, it is also envisioned that these materials can be joined by the use of other connection means such as adhesives, nuts and bolts, screws, single piece forming, rivets, and other connection means for materials as well known by people skilled in the manufacturing arts. It is also envisioned that materials other than steel may be used when the selected material is of sufficient strength and rigidity to withstand the operating environment for the application of the guard.

The basic inventive aspect of the invention has been described in a particular embodiment. However, it should be noted that the inventive aspect of this guard is the installation of a non-rotating protective cover for the gasket assembly with a tight gap between the rim edge and the wheel. Thus, although there have been described particular embodiments of the present invention of a new and useful Axle Protector for Tracked Vehicle, it is not intended that such references be construed as limitations upon the scope of this invention except as set forth in the following claims.

What is claimed is:

1. A seal guard protection apparatus for protecting a seal for a wheel with an outer rim supported by an interior support wall and interior rim defining an inner pocket, the wheel attached to an axle on a vehicle, the apparatus protecting the seal from extraneous material, comprising:
    a body housing;
    a rim edge supported by a distal end of the body housing such that the rim edge is positioned in a gap relation to the interior support wall of the inner pocket of the wheel to protect against the extraneous material while allowing the wheel to rotate; and
    a mounting bracket attached to a proximate end of the body housing for supporting the body housing on said vehicle.

2. The seal guard protection apparatus of claim 1, the body housing including a crown base at the proximate end of the housing for attaching the mounting bracket.

3. The seal guard protection apparatus of claim 1, wherein the body housing includes an axle opening which allows for access to the end of the axle.

4. The seal guard protection apparatus of claim 1, wherein the body housing is cupped to direct extraneous material away from the axle seal.

5. The seal guard protection apparatus of claim 1, wherein the gap relation to the wheel measures less than one sixteenth of an inch across.

6. The seal guard protection apparatus of claim 1, further comprising:
    a guard brim supporting the rim edge in an extended position from the body.

7. The seal guard protection apparatus of claim 6, wherein the brim is cupped from the body to the rim edge to direct extraneous material away from the axle seal.

8. The seal guard protection apparatus of claim 1, wherein the mounting bracket includes an axle oil-plug access slot.

9. The seal guard protection apparatus of claim 1, wherein the mounting bracket is shaped to allow for mounting the apparatus to protect either an inner seal or an outer seal on an axle.

10. The seal guard protection apparatus of claim 1, wherein the mounting bracket is shaped to allow for mounting the apparatus to protect either a seal on a first axle or a seal on a second axle.

11. The seal guard protection apparatus of claim 1, further comprising:
    a crown gusset attached to the mounting bracket and the body housing.

12. A seal guard protection apparatus set for protecting a wheel seal assembly with an inner seal and an outer seal from extraneous material, the set comprising:
    a first rim-edge, seal-protection apparatus for protecting the inner seal; and
    a second rim-edge, seal-protection apparatus for protecting the outer seal, the first and second protection apparatus including a rim edge supported by a distal end of a body housing such that the rim edge is positioned in a gap relation to an interior support wall of an inner pocket of a wheel to protect against the extraneous material while allowing the wheel to rotate.

13. A seal guard protection apparatus set for protecting the wheel seal assemblies on a two axle vehicle with four wheels, each wheel having both an inner seal and an outer seal, the set comprising:
    eight rim-edge, seal-protection assemblies, wherein a protection apparatus is located at the inner seal of each wheel and another protection apparatus is located at the outer seal of each wheel, wherein each protection apparatus includes a rim edge supported by a distal end of a body housing such that the rim edge is positioned in a gap relation to the interior support wall of the inner pocket of the wheel to protect against the extraneous material while allowing the wheel to rotate.

14. A method for protecting a seal between a wheel including an outer rim supported by an interior support wall and interior rim defining an inner pocket and a axle, the axle supported by an axle support, the method comprising:
    manufacturing an axle protector with a rim edge on the distal end of a body housing;
    constructing a mounting bracket on the proximate end of the body housing; and
    mounting the mounting bracket to the axle support so that the rim edge is in a gap relation to the interior support wall of the interior pocket of the wheel so that the wheel may rotate while minimizing the effects of the extraneous material on the axle seal.

15. The method of claim 14, the manufacturing comprising:
    making a body housing with a first end and a second end; and
    forming a rim on the first end of the body housing.

16. The method of claim 15, the forming comprising:
    cutting a plate to form a brim with an outside edge and an inside edge; and
    attaching the brim to the first end of the body housing such that the outside edge of the brim forms the rim on the first end of the body housing.

17. The method of claim 16, the forming further comprising:
    cupping the brim from the outside edge to the inside edge.

18. The method of claim 14, the constructing comprising:
    fabricating a crown base and an idler cap attachment bracket;
    attaching the attachment bracket to the crown base; and
    connecting the crown base to the proximate end of the body housing.

19. The method of claim 14, the constructing further comprising:
    shaping an axle plug slot in the idler cap attachment bracket.

20. The method of claim 16, further comprising:
    fabricating a crown gussets; and
    joining the gussets to the crown cap and the crown base.

* * * * *